United States Patent
Jang et al.

(10) Patent No.: US 8,477,120 B2
(45) Date of Patent: Jul. 2, 2013

(54) TOUCH SCREEN SYSTEM

(75) Inventors: Hyoung-Wook Jang, Yongin (KR); Ja-Seung Ku, Yongin (KR); Soon-Sung Ahn, Yongin (KR); Jung-Yun Kim, Yongin (KR); Choon-Hyop Lee, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 166 days.

(21) Appl. No.: 13/185,753

(22) Filed: Jul. 19, 2011

(65) Prior Publication Data
US 2012/0182254 A1 Jul. 19, 2012

(30) Foreign Application Priority Data

Jan. 14, 2011 (KR) .................. 10-2011-0003928

(51) Int. Cl.
*G06F 3/042* (2006.01)
(52) U.S. Cl.
USPC .................................................. 345/179
(58) Field of Classification Search
USPC .......... 345/179, 174, 173, 97, 205; 178/18.01
See application file for complete search history.

(56) References Cited

U.S. PATENT DOCUMENTS

| | | | | |
|---|---|---|---|---|
| 5,386,219 A * | 1/1995 | Greanias et al. | ............... | 345/174 |
| 6,590,558 B2 * | 7/2003 | Geisow et al. | .................. | 345/97 |
| 7,170,017 B2 * | 1/2007 | Chiang et al. | ............... | 178/18.01 |
| 7,352,365 B2 * | 4/2008 | Trachte | ......................... | 345/173 |
| 8,278,571 B2 * | 10/2012 | Orsley | ........................ | 178/18.03 |
| 8,355,008 B2 * | 1/2013 | Wu | .................................. | 345/174 |
| 2007/0097098 A1 * | 5/2007 | Yoshino | ........................ | 345/179 |
| 2009/0256824 A1 * | 10/2009 | Hainzl et al. | .................. | 345/179 |
| 2010/0026655 A1 * | 2/2010 | Harley | .......................... | 345/174 |
| 2010/0214252 A1 * | 8/2010 | Wu | .................................. | 345/174 |
| 2010/0231560 A1 * | 9/2010 | Toyooka et al. | ............... | 345/205 |
| 2010/0315374 A1 * | 12/2010 | Chen et al. | ..................... | 345/174 |
| 2011/0106215 A1 * | 5/2011 | Moffitt | ........................... | 607/60 |
| 2011/0267318 A1 * | 11/2011 | Knee | ............................. | 345/179 |
| 2012/0062498 A1 * | 3/2012 | Weaver et al. | ................ | 345/174 |

FOREIGN PATENT DOCUMENTS

KR 10-2009-0019902 A 2/2009

* cited by examiner

*Primary Examiner* — Fred Tzeng
(74) *Attorney, Agent, or Firm* — Christie, Parker & Hale, LLP

(57) ABSTRACT

A touch screen system according to an exemplary embodiment of the present invention includes: a touch screen panel including a plurality of driving electrodes coupled to a plurality of driving lines that extend in a first direction and a plurality of sensing electrodes coupled to a plurality of sensing lines that extend in a second direction crossing the first direction, the driving electrodes and the sensing electrodes being alternately arranged so as not to overlap with each other; and an active stylus separated from the touch screen panel, the active stylus configured to output an electric field in synchronization with driving signals that are applied to the driving lines coupled to the driving electrodes that are adjacent to the active stylus, wherein the driving electrodes and the sensing electrodes have different areas.

17 Claims, 13 Drawing Sheets

TOUCH SCREEN SYSTEM

CROSS-REFERENCE TO RELATED APPLICATION

This application claims priority to and the benefit of Korean Patent Application No. 10-2011-0003928, filed on Jan. 14, 2011, in the Korean Intellectual Property Office, the entire content of which is incorporated herein by reference.

BACKGROUND

1. Field

Aspects of embodiments according to the present invention relate to a touch screen system.

2. Description of Related Art

A touch screen panel is an input device that selects instructions displayed on a screen, such as an image display device, etc., by using a person's hand or an object to input instructions of a user.

To this end, the touch screen panel is provided on a front face of the image display device and converts positions that are directly touched by a person's hand or an object into electrical signals. Therefore, the instructions selected at the touched positions are received as the input signals. As the touch screen panel can replace a separate input device, such as a keyboard or a mouse, that is operated by being connected to the image display device, the application field of the touch screen panel is being gradually expanded.

Types of the touch screen panel include a resistive type, a light sensing type, a capacitive type, etc.

Recently, there has been increased interest in a multi-touch screen system capable of performing multi-touch recognition through the touch screen panel. In particular, in the case of the capacitive type, the multi-touch recognition may be implemented as a self capacitance type or a mutual capacitance type. When at least one finger of a person touches the surface of the touch screen panel, the capacitive type touch screen panel detects a change in capacitance formed in sensing cells that are positioned at the touched surface to recognize the touched positions.

However, according to these schemes, it is difficult to recognize more precise touch positions through the touch by a person's finger.

In order to overcome the above-mentioned problems, a sharp stylus may be used. In the case of a passive stylus, the change in capacitance is very slight at the touched surface, such that it is difficult to detect the touched position. On the other hand, an active stylus can generate an electric field. The generated electric field has an effect on the sensing cells of the touch screen panel corresponding to the actually touched position and other sensing cells coupled to a sensing line that is affected by the generated electric field, such that it may be impossible or difficult to determine the touched positions.

SUMMARY

Therefore, aspects of embodiments according to the present invention are directed toward a touch screen system capable of implementing both multi-touch recognition by a person's finger and multi-touch recognition by an active stylus, wherein the touch screen system is a mutual capacitance type.

It is another aspect of the embodiments according to the present invention to provide a touch screen system that includes an optimized structure of an electrode pattern capable of improving the accuracy of touch recognition by an active stylus.

A touch screen system according to an exemplary embodiment of the present invention includes: a touch screen panel including a plurality of driving electrodes coupled to a plurality of driving lines extending in a first direction and a plurality of sensing electrodes coupled to a plurality of sensing lines extending in a second direction crossing the first direction, the driving electrodes and the sensing electrodes being alternately arranged so as not to overlap with each other; and an active stylus separated from the touch screen panel, the active stylus being configured to output an electric field in synchronization with driving signals that are applied to the driving lines coupled to the driving electrodes adjacent to the active stylus, wherein the driving electrodes and the sensing electrodes have different areas.

One of the driving electrodes may have a polygon shape having a length in the first direction longer than a length in the second direction, and the length in the second direction of one of the driving electrodes may be shorter than a length in the second direction of one of the sensing electrodes.

The sensing electrodes may have a shape including a body extending in the second direction and a plurality of protrusions protruded in the first direction from the left and right of the body.

The protrusions may include first protrusions protruded from the left of the sensing electrode body and second protrusions protruded from the right of the sensing electrode body, and the first protrusions and the second protrusions may be arranged to be offset in the second direction, and the first protrusions of one of the sensing electrodes and the second protrusion of an adjacent one of the sensing electrodes may be arranged to be offset in the second direction.

One of the driving electrodes may have a shape including a body extending in the first direction and at least one protrusion that protrudes in the second direction from upper or lower portions of the body, and the body of the driving electrode may have a polygon shape having a length in the first direction longer than a length in the second direction.

The at least one protrusion protruded from the body of the driving electrode may be between adjacent ones of the sensing electrodes.

The plurality of driving electrodes are coupled to each other along the first direction, and the plurality of sensing electrodes are coupled to each other along the second direction.

The plurality of driving electrodes and sensing electrodes may be at the same layer and may include a transparent conductive material.

The driving electrodes and the sensing electrodes may include a plurality of fine patterns.

Adjacent ones of the driving electrodes and the sensing electrodes may configure independent sensing cells.

The touch screen system may further include: a driving circuit for sequentially applying driving signals to the driving lines; a sensing circuit coupled to the sensing lines, the sensing circuit being configured to receive sensing signals generated by detecting a change in capacitance from each of the sensing cells; and a processor for receiving the sensing signals from the sensing circuit to determine touched positions.

The active stylus may include: an electric field sensing sensor for sensing a first electric field generated by the driving signals that are applied to one of the driving lines that is touched or approached by the active stylus; a signal generator for generating a signal in order to generate a second electric field corresponding to the sensed first electric field; an electric field emitter for amplifying the signal generated from the signal generator and outputting the amplified signals as the second electric field; and a power supply for applying power to the electric field sensing sensor, the signal generator, and the electric field emitter.

The signal generated from the signal generator may be an AC voltage having a same phase as the driving signals.

The electric emitter may include a non-inverting amplifier that maintains a phase of a signal (e.g., a predetermined signal) generated from the signal generator and may amplify the amplitude of the signal generated from the signal generator.

As set forth above, the exemplary embodiments of the present invention implement the multi-touch recognition by the person's finger using the touch screen panel of the mutual capacitance scheme and the multi-touch recognition by the active stylus. The change in mutual capacitance generated when the finger is touched and the change in mutual capacitance generated when the active stylus is touched are different from each other, and the changes are differentiated and processed, thereby making it possible to perform various and more precise multi-touch recognition.

Further, the exemplary embodiments of the present invention optimize the electrode pattern structure of the touch screen panel, thereby making it possible to improve the accuracy of the multi-touch recognition implementation by the active stylus.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
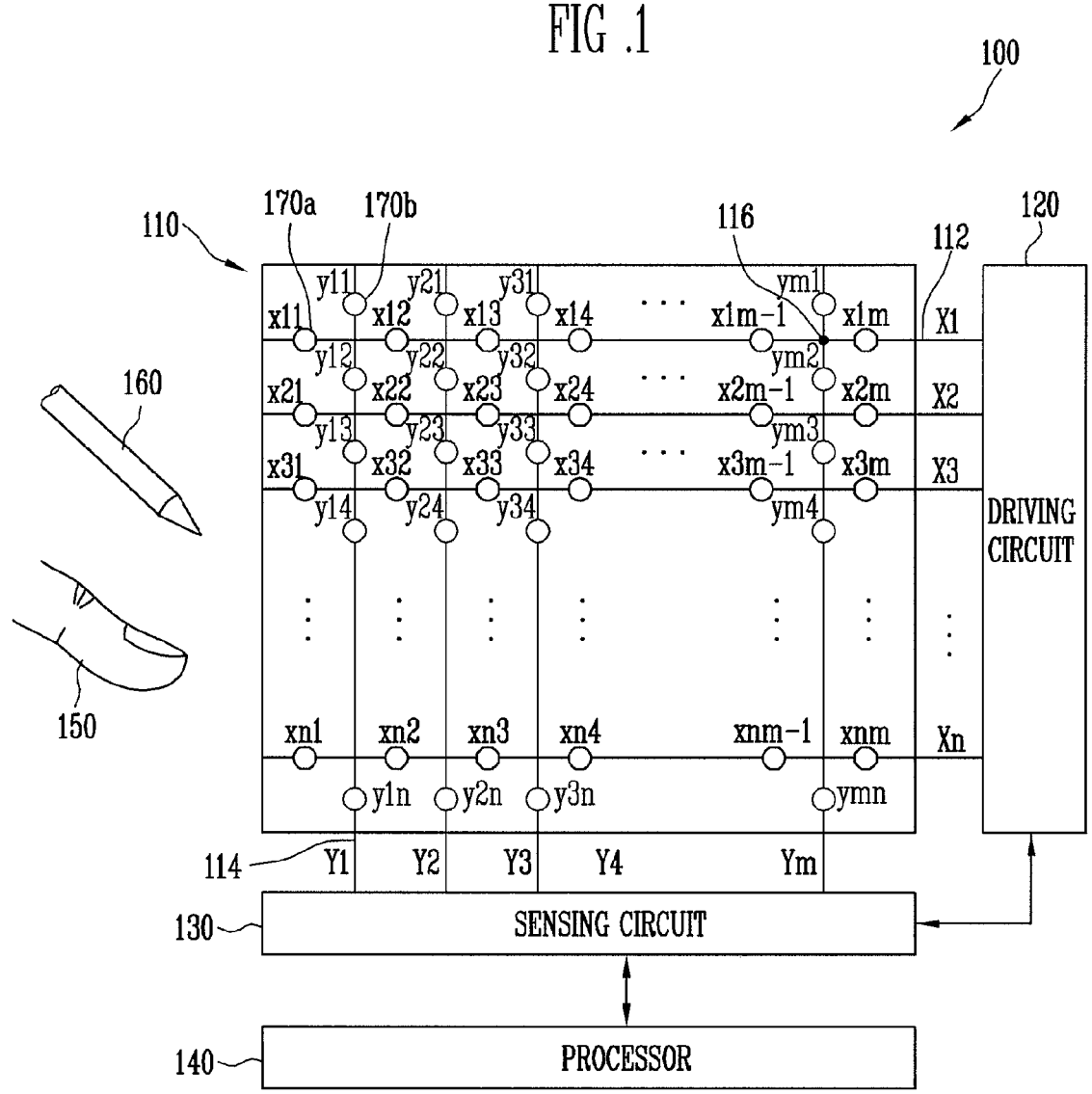
FIG. 1 is a configuration block diagram of a touch screen system according to an exemplary embodiment of the present invention.

Hereinafter, certain exemplary embodiments according to the present invention will be described with reference to the accompanying drawings. Here, when a first element is described as being coupled to a second element, the first element may be directly coupled to the second element, or may be indirectly coupled to the second element via one or more third elements. Further, some of the elements that are not essential to the complete understanding of the invention are omitted for clarity. Also, like reference numerals refer to like elements throughout.

Hereinafter, exemplary embodiments of the present invention will be described in more detail with reference to the accompanying drawings.

Figure 2:
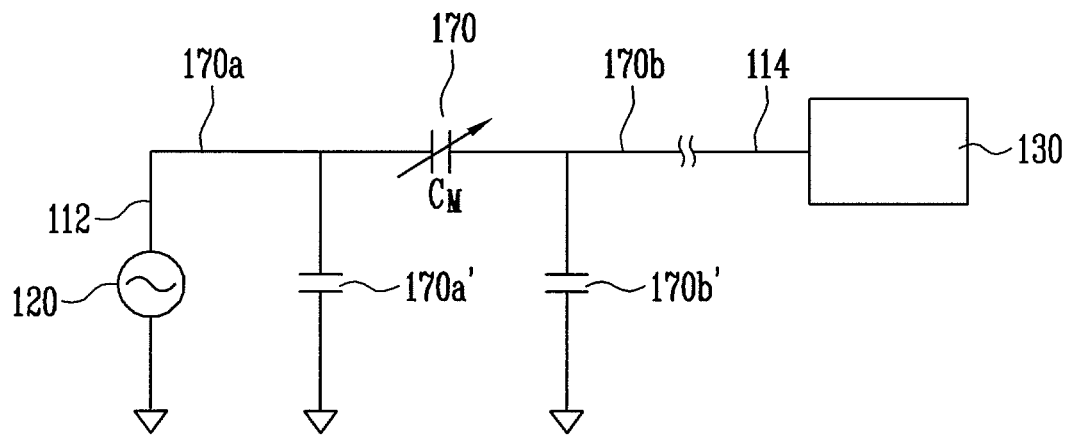
FIG. 2 is a conceptual circuit diagram of a touch screen panel shown in FIG. 1.

FIG. 1 is a configuration block diagram of a touch screen system according to an exemplary embodiment of the present invention, and FIG. 2 is a conceptual circuit diagram of a touch screen panel shown in FIG. 1.

A touch screen system 100 according to an exemplary embodiment of the present invention is configured to include a touch screen panel 110 that includes a plurality of driving electrodes 170a (x11 to x1m-xn1 to xnm). Each of the driving electrodes 170a is coupled to a corresponding one of a plurality of driving lines 112 (X1, X2, ..., Xn) that extend in a first direction and a plurality of sensing electrodes 170b (y11 to y1n to ym1 to xmn). Each of the sensing electrodes 170b is coupled to a corresponding one of a plurality of sensing lines 114 (Y1, Y2, ..., Ym) that extend in a direction crossing the driving lines 112, and the sensing electrodes 170b and the plurality of driving electrodes 170a are alternately disposed so as not to overlap with each other. The touch screen system 100 also includes a driving circuit 120 for sequentially applying driving signals to each driving line 112, a sensing circuit 130 for detecting the change in capacitance sensed from each sensing line 114 in order to receive the generated sensing signals, a processor 140 for receiving the sensing signal from the sensing circuit 130 in order to determine the detected touch position, and an active stylus 160 to be used to touch the touch screen panel 110.

In this configuration, the driving electrodes 170a and the sensing electrodes 170b may be formed on different layers or on the same layer. The driving electrodes 170a and the sensing electrodes 170b are alternately disposed to be close to each other without overlapping with each other.

In one embodiment, the driving electrodes 170a and the sensing electrodes 170b may be formed to be close to each other in a regular pattern like a diamond pattern. However, this is only one exemplary embodiment. The shape of the electrodes is not limited to the diamond shape and may be implemented by various suitable shapes in which the driving electrodes and the sensing electrodes may be close to each other.

In addition, when the driving electrodes 170a and the sensing electrodes 170b are formed at the same layer, since a short would be generated at the crossing node 116 of the driving electrodes 170a and the sensing electrodes 170b, the driving electrodes 170a or the sensing electrodes 170b arranged at the same line are coupled to one another through a bridge pattern (not shown) formed at different layers, such that it prevents the occurrence of the short at the crossing region between the connection part of the sensing electrodes 170b and the connection part of the driving electrodes 170a.

In this configuration, the active stylus 160 is configured to be separated from the touch screen panel 110. When the active stylus 160 approaches or touches the touch screen panel 110, it is synchronized with the driving signals that are applied to the driving line 112 that is coupled to the adjacent driving electrode 170a, in order to generate an electric field.

The plurality of driving electrodes 170a and sensing electrodes 170b may be made of a transparent conductive material, and the transparent conductive material may be made of indium tin oxide (ITO), indium zinc oxide (IZO), carbon nano tube (CNT), or the like.

As described above, a mutual capacitance is formed between adjacent driving electrodes 170a and sensing electrodes 170b that are alternately arranged with the driving electrodes 170a, and the mutual capacitance between each driving electrode 170a and a corresponding sensing electrode 170b functions as a sensing cell to perform touch recognition.

The mutual capacitance, generated at the sensing cell, generates the coupled sensing signals to the sensing line 114 that is coupled to the sensing electrode 170b included in the sensing cell, when the driving signals are applied to the driving line 112 that is coupled to the driving electrode 170a included in the sensing cell from the driving circuit 120.

That is, the mutual capacitance at each sensing cell is sensed through the sensing line that is coupled to each sensing cell when the driving signal is applied to the driving line that is coupled to each sensing cell.

In addition, the driving circuit 120 sequentially applies the driving signals to each driving line X1, X2, . . . , Xn, and therefore, when the driving circuit 120 applies the driving signals to any one of the driving lines X1, X2, . . . , Xn, other driving lines remain in a ground state.

Therefore, the driving electrodes 170a coupled to the driving lines 112 that are applied with the driving signals, and the plurality of adjacent sensing electrodes 170b crossing the driving electrodes 170a, configure the sensing cells. The mutual capacitance is formed in each sensing cell. As described above, when the finger 150 or the stylus 160 touches the sensing cell, a corresponding change in capacitance occurs in the sensing cell.

As shown in FIG. 2, the touch screen panel 110 according to an exemplary embodiment of the present invention may be represented by the mutual capacitance. The touch screen panel 110 includes the driving electrode 170a that is coupled to the driving line 112 and the sensing electrode 170b that is coupled to the sensing line 114, wherein the driving electrode 170a and the sensing electrode 170b are spatially separated from each other to form a capacitance coupling node (e.g., the sensing cell 170). In this configuration, the driving line 112 is coupled to the driving circuit 120 that is represented as a voltage source, and the sensing line 114 is coupled to the sensing circuit 130.

In addition, the driving electrode 170a and the sensing electrode 170b may each include a parasitic capacitance 170a' and 170b' (e.g., a predetermined parasitic capacitance).

As described above, the driving electrode 170a and the adjacent sensing electrode 170b crossing therewith configure the sensing cell 170. When there is no conductive object (e.g., the finger 150 or the stylus 160) approaching the sensing cell 170, the mutual capacitance of the sensing cell 170 is not changed, but when the conductive object approaches or touches the sensing cell 170, the mutual capacitance is changed. As a result, these changes cause a change current (and/or voltage) to be transferred to the sensing line 114 that is coupled to the sensing cell 170.

The sensing circuit 130 that is coupled to the sensing line 114 converts the information (sensing signal) on the change in capacitance and the position of the sensing cell 170 into a suitable type via, for example, an ADC (not shown) and transfers the information to the processor 140 of FIG. 1.

An exemplary embodiment of a scheme for detecting the position of the sensing cell 170 in which the change in capacitance occurs will be described below.

When the sensing circuit 130 senses the change in capacitance of the sensing line 114 that is coupled to the sensing cell 170, the coordinates of the sensing line 114 in which the change in capacitance occurs and the coordinates of the sensing electrode 170a configuring the sensing cell 170, which is coupled to the driving line 112 that is applied with the driving signal from the driving circuit 120, are output, such that the coordinates of at least one sensing cell 170, in which the touch is made, are obtained.

This is implemented by coupling the sensing circuit 130 and the driving circuit 120 through a wiring (not shown), etc. The driving circuit 120 scans (by sequentially applying the driving signals) the driving lines 112 and both continuously and concurrently (e.g., simultaneously) outputs the coordinates of the scanned driving lines to the sensing circuit 130, such that the sensing circuit 130 may obtain the position where the capacitance is changed, that is the position coordinates of the sensing electrode 170a configuring the sensing cell 170, while sensing the change in capacitance of the sensing line 114.

According to the above-mentioned configuration, the touch screen system according to an exemplary embodiment of the present invention can recognize a plurality of touched points, that is, the multi touch recognition.

In addition, the above described exemplary embodiment of the present invention implements both the multi-touch recognition by the active stylus 160 and the multi-touch recognition by the person's finger 150.

In order to implement the touch position recognition that is more precise than the touch by the person's finger, the multi-touch recognition may be implemented by the sharp active stylus that generates the electric field.

However, the typical active stylus continuously generates and emits the electric field, therefore it is very difficult or impossible to accurately determine the touched position due to the influence of the continuously emitted electric field on the sensing cell corresponding to the actually touched position, as well as, to other sensing cells that are not touched.

Therefore, in an exemplary embodiment of the present invention, when the active stylus approaches (or touches) a specific sensing cell, it amplifies and outputs the electric field in synchronization with the driving signal that is applied to the driving line coupled to the sensing cell, thereby making it possible to overcome the above described problem of the typical active stylus.

That is, when the active stylus 160, according to the exemplary embodiment of the present invention, touches the specific sensing cells 116 of the touch screen panel 110, the active stylus 160 generates the electric field to sense the touch only when the driving signal is applied to the sensing cells, such that the electric field has no effect on other sensing cells other than the touched sensing cells, thereby making it possible to implement the multi-touch recognition by the use of the active stylus.

In addition, the exemplary embodiment of the present invention uses the fact that the change in mutual capacitance generated when the touch screen panel 110 is touched by the finger 150 and the change in mutual capacitance when the touch screen panel 110 is touched by the active stylus 160 are different from each other, to divide and process the changes accordingly in the sensing circuit 130 and the processor 140, thereby making it possible to implement various multi touch recognitions.

The operation of the exemplary embodiment of the present invention will be described below in more detail with reference to FIGS. 3A to 9.

First, the touch recognition implementation by the finger touch will be described with reference to FIGS. 3A to 4B.

Figure 3A:
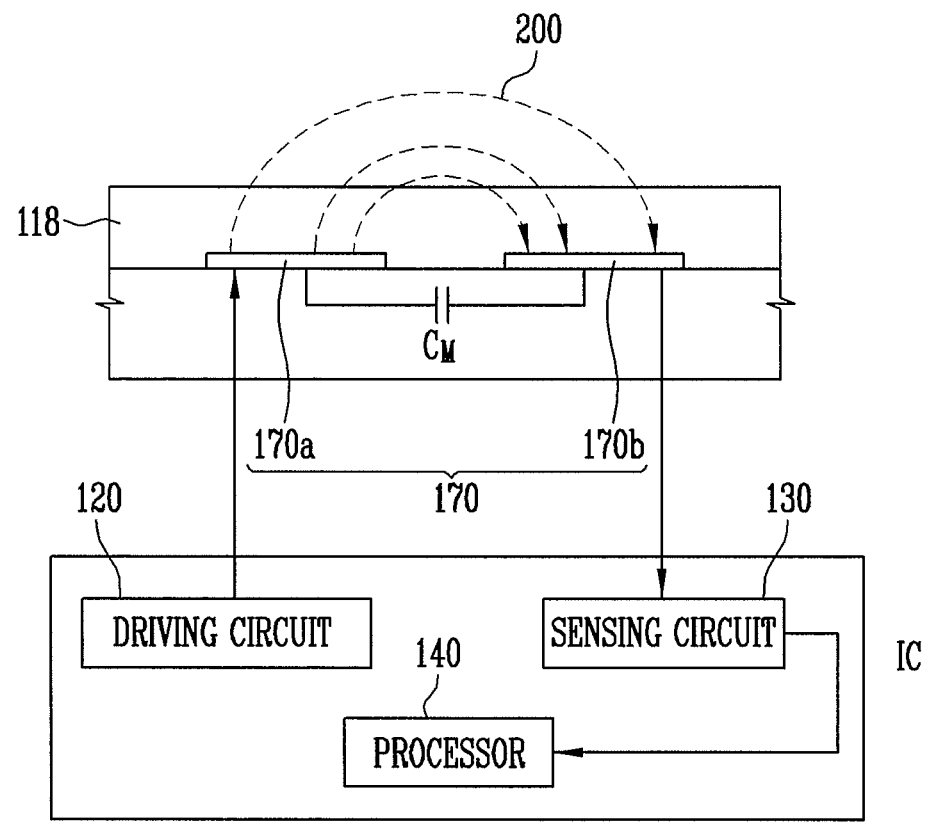
FIG. 3A is a cross-sectional view of sensing cells under normal state (no touch) conditions.
Figure 3B:
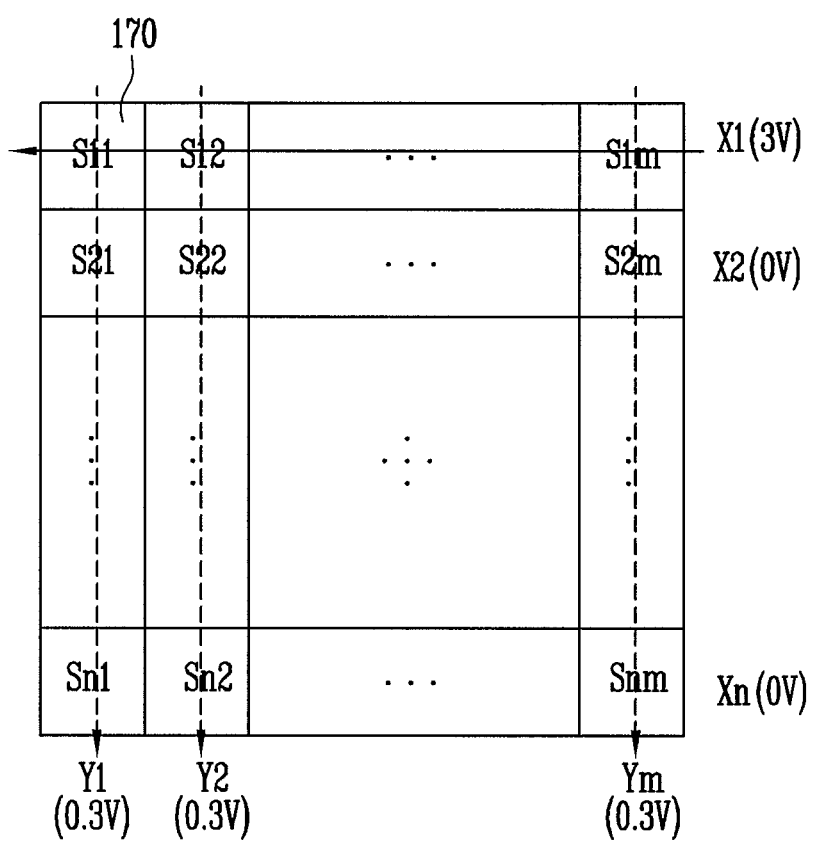
FIG. 3B is a diagram schematically showing sensing results according to driving signals applied to each sensing cell shown in FIG. 3A.

FIG. 3A is a cross-sectional view of the sensing cell under the normal state (no touch) conditions, and FIG. 3B is a diagram schematically showing the sensing results according to the driving signals applied to each sensing cell shown in FIG. 3A.

FIG. 3A shows the mutual capacitance electric field line 200 between the driving electrode 170a and the sensing electrode 170b that configure a single sensing cell 170 and are adjacently disposed at the same layer. In addition, a passivation layer 118 is formed on top of the driving electrode 170a and the sensing electrode 170b, but may be removed in some cases.

In this case, the mutual capacitance (CM) is formed between the driving electrode 170 and the sensing electrode 170b that configure the sensing cell 170.

Here, the mutual capacitance CM generated at each sensing cell 170 is generated when the driving signal is applied to the driving line (112 of FIG. 1), which is coupled to the driving electrode 170a configuring each sensing cell, from the driving circuit 120.

In addition, as shown in FIG. 3A, the driving circuit 120 is integrated together with the above-mentioned sensing circuit 130 and the processor 140, such that they may be included in a single IC chip.

That is, referring to FIG. 3B, the driving circuit 120 sequentially applies the driving signals (for example, a voltage of 3V) to each driving line X1, X2, . . . , Xn, and therefore, when the driving circuit 120 applies the driving signals to any one of the driving lines X1, X2, . . . , Xn, other driving lines remain in a ground state (e.g., 0V). FIG. 3B shows an example where the driving signal is applied to the first driving line X1.

In addition, FIG. 3B shows the case where the driving electrode 170a and the adjacent sensing electrode 170b configure each sensing cell 170 (S11 to Snm). The plurality of driving electrodes 170a (x11 to x1m to xn1 to xnm), which are coupled to the plurality of driving lines 112, and the plurality of sensing electrodes 170b (y11 to y1n to ym1 to ymn), which are coupled to the plurality of sensing lines 114 that extend in a direction crossing the driving lines 112, are alternately disposed so as not to overlap with each other.

That is, the sensing cell S11 is configured to include the driving electrode x11 and the sensing electrode y11 adjacent thereto, and the sensing cell Snm is configured to include the driving electrode xnm and the sensing electrode ymn adjacent thereto.

Therefore, the mutual capacitance between each driving electrode and each sensing electrode configuring the plurality of sensing cells S11, S12, . . . , S1m is formed in the plurality of sensing cells S11, S12, . . . , S1m, such that the voltage (for example, 0.3V) corresponding to the mutual capacitance is sensed by the sensing lines Y1, Y2, . . . , Ym coupled to each sensing cell applied with the driving signal.

Figure 4A:
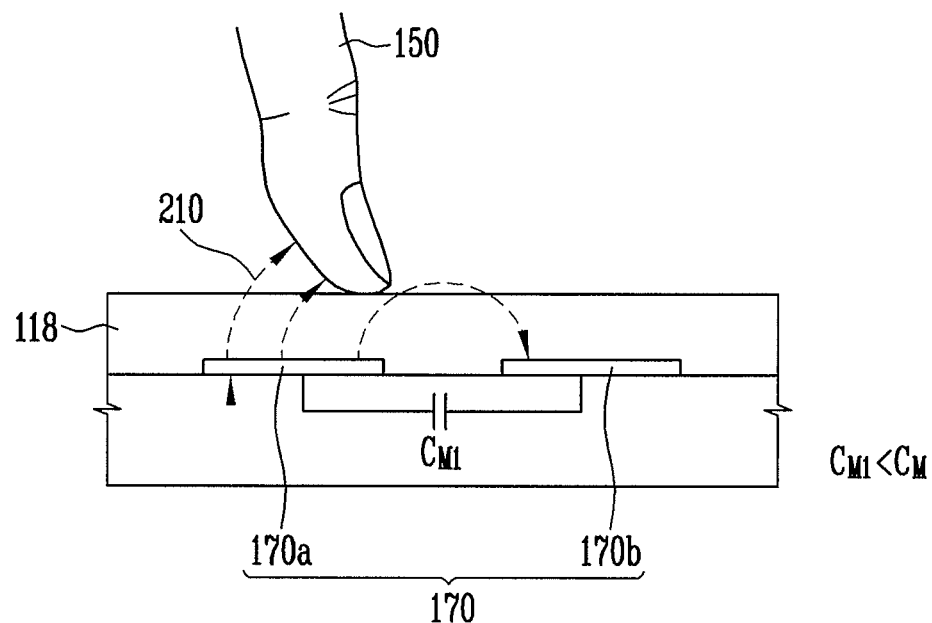
FIG. 4A is a cross-sectional view of the sensing cells under a touched condition by a finger.
Figure 4B:
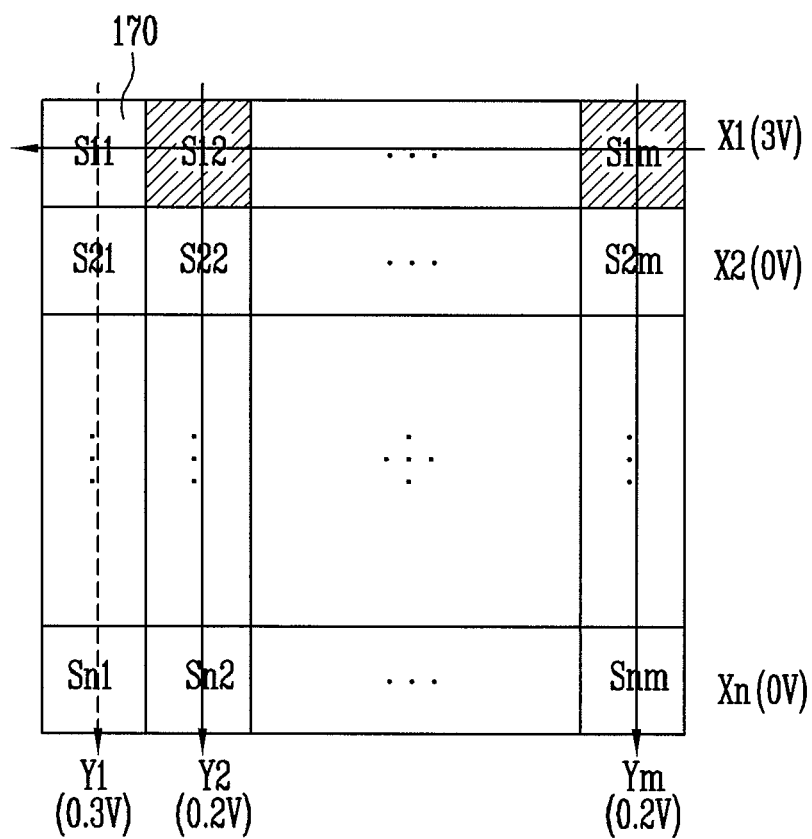
FIG. 4B is a diagram schematically showing the sensing results according to the driving signals applied to each sensing cell shown in FIG. 4A.

FIG. 4A is a cross-sectional view of the sensing cell under the touched conditions by a finger, and FIG. 4B is a diagram schematically showing the sensing results according to the driving signals applied to the each sensing cell shown in FIG. 4A.

Referring to FIG. 4A, when the finger 150 of a person touches at least one sensing cell 170, the electric field line 210 between the driving electrode 170a and the sensing electrode 170b is interrupted as shown, and the electric field line is branched into the finger 150 and a ground through the capacitance path of the body of the person, such that the mutual capacitance CM1 at the sensing cell 170 is smaller than the mutual capacitance CM at the normal state shown in FIG. 3A (CM1<CM).

In addition, the change in mutual capacitance at each sensing cell 170 changes the voltage transferred to the sensing line 114 that is coupled to the sensing cell 170.

That is, as shown in FIG. 4B, each mutual capacitance CM is formed at each sensing cell S11, S12, . . . , S1m configured to include the plurality of sensing electrodes 170b adjacently crossing the plurality of driving electrodes 170a. The first driving line X1 that is coupled to the driving electrodes 170a is applied with the driving signal (for example, a voltage of 3V), which is sequentially applied to the driving lines X1, X2, . . . , Xn by the driving circuit (e.g., 120 of FIG. 1). When at least one sensing cell (for example, S12 or S1m) is touched by the finger 150, the mutual capacitance CM1 is reduced, and thus the voltage (for example, 0.1V) corresponding to the reduced mutual capacitance is sensed by the sensing lines Y2 and Ym that are coupled to the touched sensing cells S12 and S1m, respectively.

However, other sensing cells, which are coupled to the first driving line X1 but are not touched by the finger 150, maintain their existing mutual capacitance CM unchanged, such that the above-mentioned voltage (for example, 0.3V) is sensed by the sensing lines that are coupled to the sensing cells.

Thereafter, the sensing circuit (e.g., the sensing circuit 130 of FIG. 1) that is coupled to the sensing lines Y1, Y2, . . . , Ym converts the information (sensing signal) on the change and position of the touched sensing cells S12 and S1m into a suitable type via an ADC (not shown) and transfers the information to the processor (e.g., the processor 140 of FIG. 1).

The exemplary embodiment of the scheme for detecting the position of the sensing cell 170 in which the change in capacitance is generated is described with reference to FIG. 1, and therefore, the description thereof will be described. By the above-mentioned configuration, the recognition of the plurality of touched points or locations by a finger, that is, the multi-touch recognition may be implemented.

However, as shown in FIG. 4A, when the touch is generally made by a finger 150, a touched area (A) is about 6 mm per side. The touched area is generally larger than that of the driving electrode 170a and the sensing electrode 170b that configure the sensing cell 170. Therefore, when using the finger 150, it is difficult to implement more precise touch recognition.

In addition, when using a sharp passive stylus, e.g., a passive stylus implemented by a simple conductor, the touched surface is small, and thus, the change in capacitance at the touched surface is very slight, such that it is difficult to perform the detection.

Therefore, the above described exemplary embodiment of the present invention can implement the multi-touch recognition using the sharp active stylus together with the multi-touch recognition using the finger, thereby overcoming the problem in the related art.

However, as described above, the typical active stylus has a configuration that continuously generates and emits the electric field, such that it is impossible or very difficult to accurately determine the touched position due to the influence of continuously emitted electric field on the sensing cell corresponding to the actually touched position, as well as, to other sensing cells that are not touched.

Therefore, in the exemplary embodiment of the present invention, when the active stylus approaches (or touches) the specific sensing cell, it has a configuration that amplifies/outputs the electric field in synchronization with the driving signal that is applied to the driving line coupled to the sensing cell.

Figure 5:
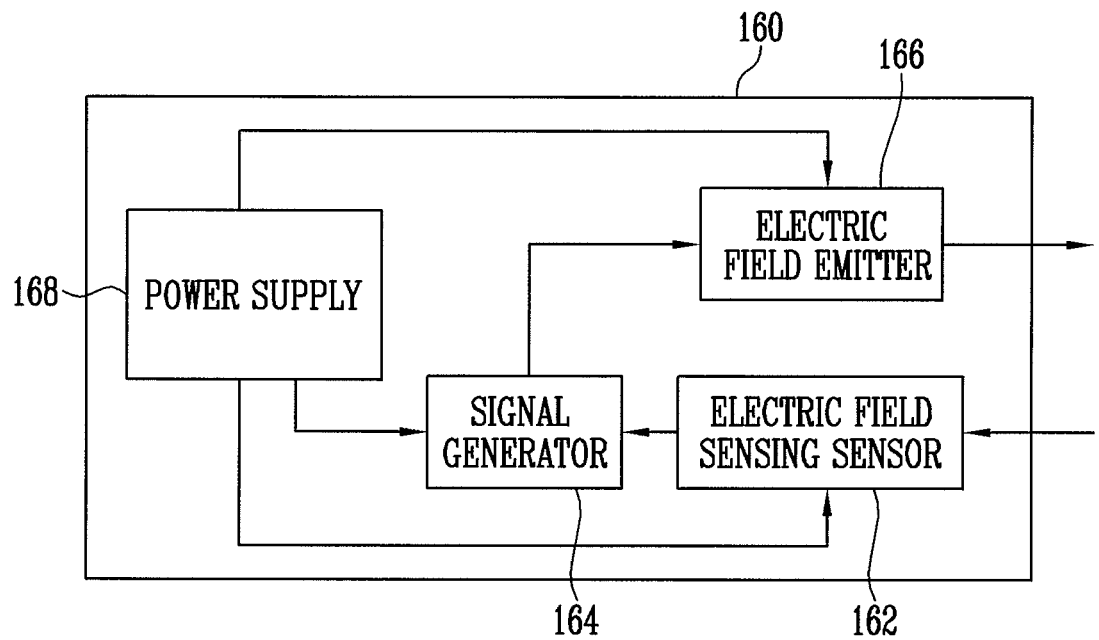
FIG. 5 is a block diagram showing a configuration of an active stylus according to an exemplary embodiment of the present invention.

FIG. 5 is a block diagram showing a configuration of an active stylus according to an exemplary embodiment of the present invention.

FIG. 5 is a block diagram that conceptually illustrates each component of the active stylus and does not show the appearance of the active stylus. For example, the active stylus may be implemented as a conductor having a shape in which an area of a portion for contacting the touch screen panel is small (e.g., smaller than a finger).

Referring to FIG. 5, the active stylus 160, according to an exemplary embodiment of the present invention, is configured to include an electric field sensing sensor 162 that senses an electric field generated by the driving signal applied to the driving electrode 170a that is touched (or approached) by the active stylus 160; a signal generator 164 that generates a signal (e.g., a predetermined signal such as an AC voltage) for generating a separate electric field corresponding to the sensed electric field; an electric field emitter 166 that amplifies the signal generated from the signal generator 164 and outputs the amplified signal as an electric field; and a power supply 168 that supplies power to each of the components 162, 164, and 166.

In one embodiment, the electric field sensing sensor 162 may be implemented to include a coil so as to sense the electric field generated by applying the driving signal. That is, the electric field sensing sensor 162 is positioned in the electric field forming region that is generated by the driving signal, such that an electric force may be sensed by the electric field sensing sensor 162.

In addition, when the electric field is sensed by the electric field sensing sensor 162, the signal generator 164 generates the predetermined signal accordingly. For example, an AC voltage having the same phase as the driving signal may be generated corresponding to the sensed electric field.

Thereafter, the signal (e.g., an AC voltage) generated through the signal generator 164 is amplified through the electric field emitter 166, and the amplified signal is output as an electric field through the end of the stylus 160. In one embodiment, the electric field emitter 166 may be implemented to include a non-inverting amplifier that amplifies the amplitude of the AC voltage while maintaining the phase of the generated AC voltage as it is and an inverting amplifier that inverts the amplitude of the AC voltage while maintaining the phase of the AC voltage.

As described above, when the active stylus 160, according to the exemplary embodiment of the present invention, touches specific sensing cells 170 of the touch screen panel 110, it senses the touch only when the driving signal is applied to the sensing cells to generate the electric field. Therefore, the electric field has no effect on other sensing cells other than the touched sensing cells, that is, the other sensing cells that are coupled to the driving lines are in the ground state, thereby making it possible to implement the multi-touch recognition by the use of the active stylus.

Figure 6A:
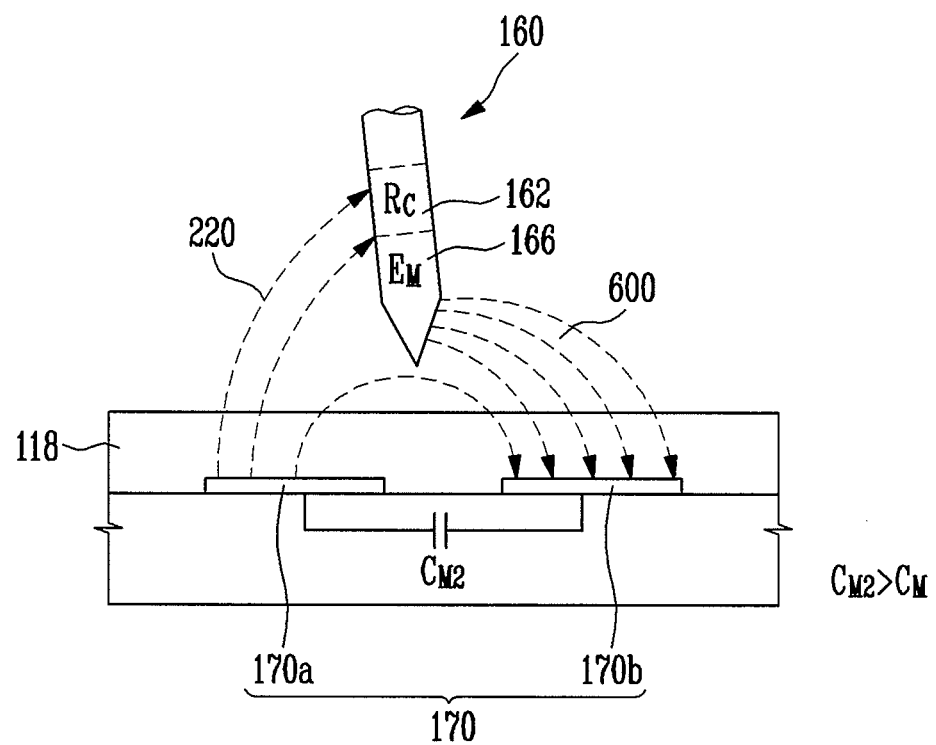
FIG. 6A is a cross-sectional view showing the sensing cells under an active stylus touched condition according to an exemplary embodiment of the present invention.
Figure 6B:
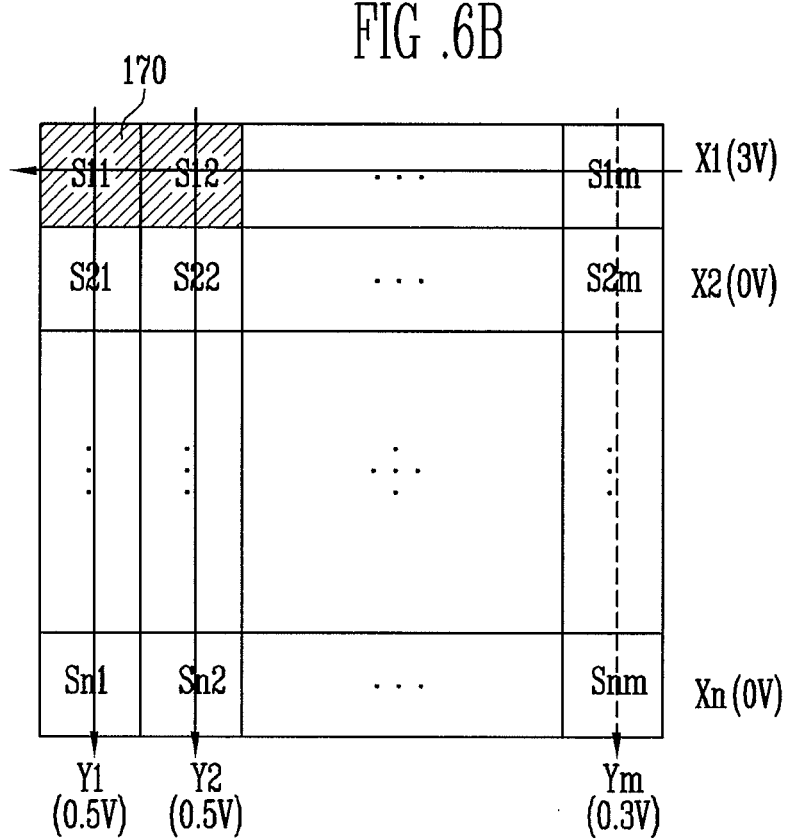
FIGS. 6B and 6C are diagrams schematically showing the sensing results according to the driving signals applied to each sensing cell shown in FIG. 6A.
Figure 6C:
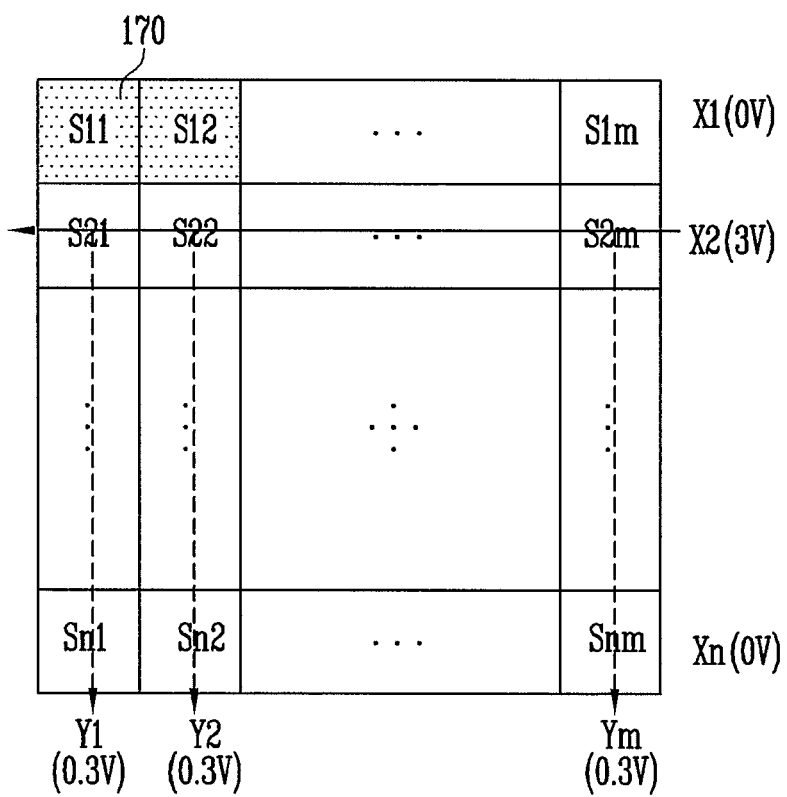

FIG. 6A is a cross-sectional view of the sensing cell under the active stylus touched conditions according to an exemplary embodiment of the present invention, and FIGS. 6B and 6C are diagrams schematically showing the sensing results according to the driving signal applied to each sensing cell shown in FIG. 6A.

FIG. 6A shows an example in which the electric field that is output by the active stylus 160 is amplified by the non-inverting amplifier. Here, the state in which the active stylus 160 is touched is substantially the same as the embodiment described in FIGS. 3A and 3B, and the description thereof will be omitted.

Referring to FIG. 6A, it illustrates the change in mutual capacitance at the sensing cell 170 due to the touch of the active stylus 160 in the state in which the driving signal is applied to the driving line 112.

When the active stylus 160 touches at least one sensing cell 170, the active stylus 160 senses the electric field that is generated by the driving signal applied to the driving electrode 170a of the sensing cell 170, and amplifies/outputs the corresponding electric field.

That is, the electric field sensing sensor 162, as the receiver RC of the active stylus 160, senses the electric field that is generated by the driving signal, and the electric field emitter 166, as an emitter Em, amplifies/outputs the corresponding electric field.

The first electric field line 220 of FIG. 6A illustrates an electric field generated by the application of the driving signal, and the second electric field line 600 illustrates the electric field output from the active stylus 160.

In this case, the electric field output from the active stylus 160 corresponds to the AC voltage output through the non-inverting amplifier, wherein the AC voltage has the same phase as the driving signal corresponding to the electric field generated by the application of the driving signal.

As shown in FIG. 6A, the first and second electric field lines (220 and 600) are each formed in a direction toward the sensing electrode 170b from the driving electrode 170a or the active stylus 160.

That is, as shown in reference to the sensing cell 170 in FIG. 6A, the mutual capacitance CM2 between the driving electrode 170a and the sensing electrode 170b is increased as compared to the mutual capacitance CM at a normal state (non-touched state) (CM2>CM).

In addition, the change in mutual capacitance at each sensing cell changes the voltage transferred to the sensing electrode 170b that is coupled to the sensing cell 170.

Referring to FIG. 6B, the driving circuit (120 of FIG. 1) sequentially applies the driving signals (for example, a voltage of 3V) to each driving line X1, X2, ..., Xn, and therefore, when the driving circuit 120 applies the driving signals to any one of the driving lines X1, X2, ..., Xn, other driving lines remain in a ground state. FIG. 6B shows an example where the driving signal is applied to the first driving line X1.

A mutual capacitance CM is formed in each of the plurality of sensing cells S11, S12, ..., S1m configured to include the plurality of sensing electrodes 170b adjacently crossing the plurality of driving electrodes 170a that are coupled to the first driving line X1 applied with the driving signal. When at least one sensing cell (for example, S11 and S12) is touched by the active stylus 160, the mutual capacitance CM2 is increased, such that a voltage (for example, 0.5V) corresponding to the increased mutual capacitance is sensed by the sensing lines Y1 and Y2 that are coupled to the touched sensing cells S11 and S12.

However, other sensing cells, which are coupled with the first driving line X1 but are not touched by the active stylus 160, maintain their existing mutual capacitances CM as they are, such that a different voltage (for example, 0.3V) is sensed by the sensing lines that are coupled to the sensing cells.

In addition, referring to FIG. 6C for describing in more detail the operation of the active stylus 160 in the case where the active stylus 160 touches the sensing cells S11 and S12 that are coupled to the first driving line X1, but the driving signal is applied to the second driving line X2, not the first driving line X1.

In this case, the active stylus 160 does not sense the electric field since the driving signal is not applied to the driving line X1 that is coupled to the touched sensing cells S11 and S12, such that the active stylus 160 does not output a separate electric field.

Therefore, in this case, the active stylus 160 is a passive conductor, such that the touch recognition may not be performed. That is, the voltage (for example, 0.3V) corresponding to all the existing mutual capacitances CM is sensed by the sensing lines Y1, Y2, . . . , Ym.

However, if the active stylus 160 continuously emits the electric field without being synchronized with the applied driving signal, similar to the typical active stylus in the case of FIG. 6B, the stylus may erroneously sense touching with the sensing cells S21 and S22 even though the stylus does not actually touch the sensing cells S21 and S22.

As a result, when the active stylus 160, according to the exemplary embodiment of the present invention, touches the specific sensing cells 170 of the touch screen panel 110, it senses touching only when the driving signal is applied to the sensing cells in order to generate the electric field, such that the electric field has no effect on other sensing cells other than the touched sensing cells. That is, other sensing cells are coupled to the driving lines that are in the ground state, thereby making it possible to implement the multi-touch recognition by the use of the active stylus.

Here, the sensing circuit 130 that is coupled to the sensing lines Y1, Y2, . . . , Ym converts the information (sensing signal) on the change in capacitance and position of the touched sensing cells S12 and S1m into a suitable type via the ADC (not shown) and transfers the information to the processor 140.

The exemplary embodiment of the above described scheme of detecting the position of the sensing cell 170 in which the change in capacitance is generated is described with reference to FIG. 1, and therefore, the description thereof will be omitted. By the above-mentioned configuration, the recognition of the plurality of touched points by the active stylus 160, that is the multi-touch recognition, may be implemented.

In addition, the above described exemplary embodiment of the present invention uses the fact that the change in mutual capacitance generated when the finger 150 touches the sensing cell and the change in mutual capacitance when the active stylus 160 touches the sensing cell are different from each other, to recognize and process the changes in the sensing circuit 130 and the processor 140, thereby making it possible to implement various multi-touch recognitions.

That is, even though the finger 150 and the active stylus 160 are touched, the touches may be differentiated and recognized. In the exemplary embodiment described with reference to FIG. 6A-6C, when the active stylus 160 outputs the AC signal having the same phase as the driving signal through the non-inverting amplifier, the amplitude (for example, 0.5V) of the sensing signal that is sensed by the sensing line has a large difference from the amplitude (for example, 0.2V) of the sensing signal that is generated by the touch of the finger, which may be easily differentiated by, for example, an amplitude detector (not shown) and/or an amplitude comparator (not shown) that are included in the sensing circuit 130.

However, in the case where the driving electrode 170a and the sensing electrode 170b configuring the sensing cell 170 have the same area and pattern, and when the active stylus 160, not the finger 150, moves while touching the sensing cell 170, it is difficult to accurately sense the touched position since there is no position correlation between the moving stylus 160 and the sensing cell 170 corresponding thereto.

This will be described in more detail with reference to FIGS. 7 and 8.

Figure 7:
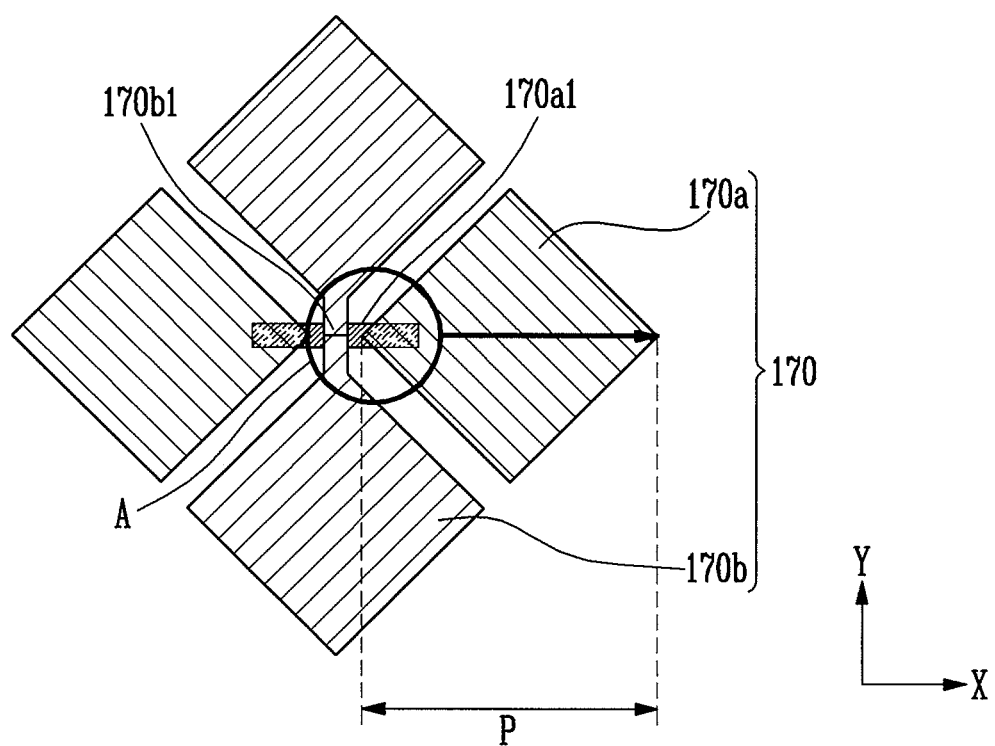
FIG. 7 is a plan view showing an electrode pattern of a typical touch screen panel.
Figure 8:
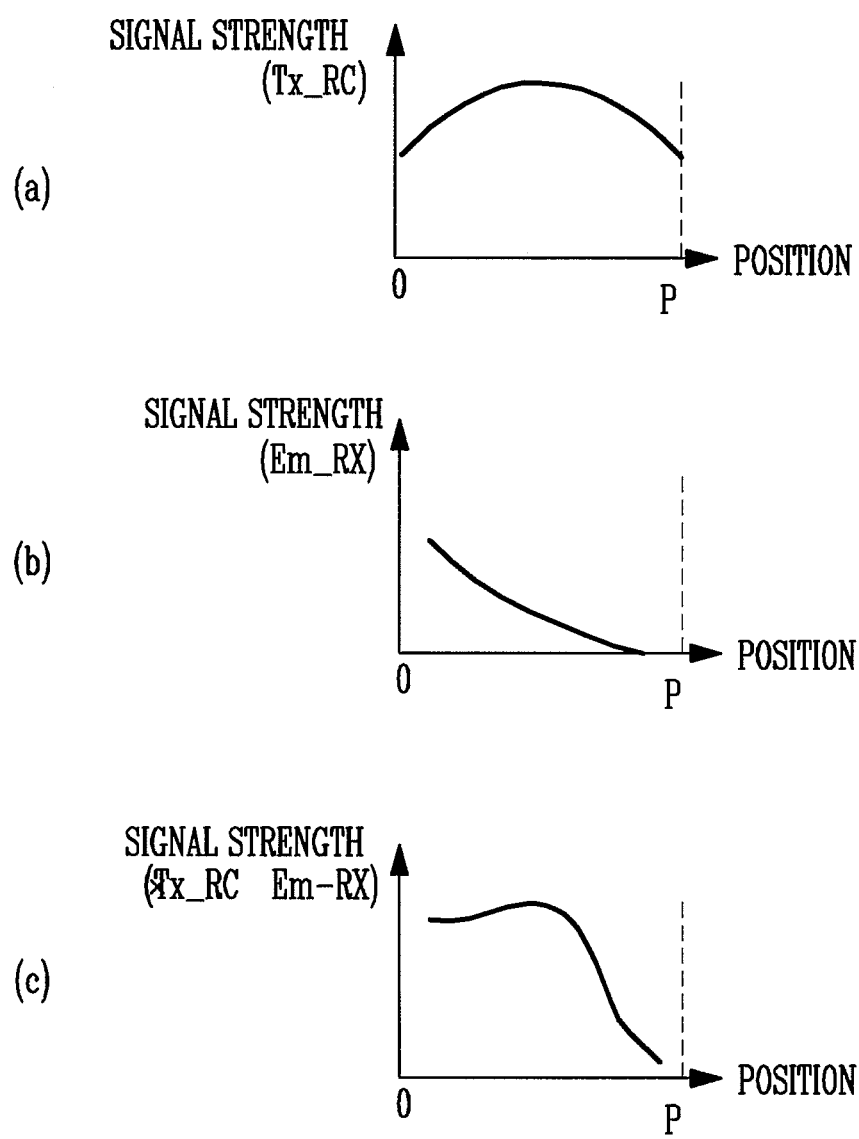
FIG. 8 is a graph for describing a problem when the active stylus moves, while touching the electrode pattern shown in FIG. 7.

FIG. 7 is a plan view showing an electrode pattern of a typical touch screen panel, and FIG. 8 is a graph for describing the case where the active stylus moves while touching the electrode pattern shown in FIG. 7.

Referring first to FIG. 7, the sensing cells 170 are each configured to include the driving electrodes 170a and the sensing electrodes 170b adjacently crossing therewith.

In this case, the plurality of driving electrodes 170a are coupled to one another along a first direction (e.g., X-axis direction), and the sensing electrodes 170b and the driving electrodes 170a are alternately disposed so as not to overlap with each other. The sensing electrodes 170b are coupled to each other along a second direction (e.g., Y-axis direction) that crosses the first direction.

In this case, as shown, the driving electrodes 170a and the sensing electrodes 170b are configured in the same diamond shape and have substantially the same area.

In addition, the driving electrodes 170a and the sensing electrodes 170b are each coupled in a line unit along the first and second directions, respectively, by first and second connection patterns 170a1 and 170b1, respectively, as shown.

In FIG. 7, the first and/or second connection patterns 170a1 and 170b1 may be each patterned as an independent pattern to be coupled to the driving electrode or the sensing electrode 170a and 170b by an indirect connection, or may be patterned to be integrally coupled to the driving electrode or the sensing electrode 170a and 170b from a same step of patterning the driving electrode or the sensing electrode 170a and 170b.

For example, the first connection patterns 170a1 are each patterned to be an independent pattern at the upper or lower portion of the driving electrodes 170a, such that the driving electrodes 170a may be coupled in a line unit along the first direction while being electrically connected to one another by the first connection patterns 170a1 at the upper portion or the lower portion of the driving electrodes 170a.

The first connection patterns 170a1 may be formed using a transparent electrode material such as ITO, etc., that is similar to the electrodes 170a and 170b or may be formed using an opaque low resistance material, but may be formed controlling its width, etc., so as to prevent the visualization of the patterns.

In addition, the second connection patterns 170b1 may be integrally patterned with the sensing electrodes 170b in a step of patterning the electrodes 170a and 170b in order to couple the sensing electrodes 170b in a line unit along the second direction.

In this case, an insulating layer (not shown) is interposed between the first connection patterns 170a1 and the second connection patterns 170b1 in order to secure their stability. Through this, even though the driving electrodes 170a and the sensing electrodes 170b are formed on the same layer, the short circuit at the crossing point of the electrodes may be prevented.

In the sensing cell 170 having the above described structure, when the sensing cell 170 is touched, the driving signal is applied to the driving line (112 of FIG. 1) that is coupled to the driving electrode 170a and the sensing signal corresponding thereto is applied to the sensing circuit (130 of FIG. 1) through the sensing line (114 of FIG. 1) that is coupled to the sensing electrode 170b.

However, in the case where the driving electrode 170a and the sensing electrode 170b configuring the sensing cell 170 have the same area and pattern, when the active stylus 160, according to the exemplary embodiment of the present invention described with reference to FIGS. 5 and 6, moves while touching the sensing cell 170, it may be difficult to accurately sense the touched position regardless of the position correlation between the moving active stylus 160 and the sensing cell 170 corresponding thereto.

For example, the description will be made under the assumption that the active stylus 160 moves in the arrow direction shown in FIG. 7. The active stylus 160, which is approaching or touching point A of FIG. 7, moves from the left end to the right end via the center of the electrode 170a. That is, the active stylus 160 moves through a path (P) between the left and right corners of the driving electrode 170a of the sensing cell 170.

As described above, when the active stylus 160 approaches or touches the driving electrode 170a, the electric field sensing sensor (162 of FIG. 5), which is the receiver (RC) of the active stylus for the driving signal applied to the driving electrode 170a, senses the electric field generated by the driving signal. Then, the electric field emitter (166 of FIG. 5), which is the emitter Em that amplifies/outputs the amplified electric field corresponding to the electric field generated by the driving signal, outputs the sensing signal, which is applied to the sensing circuit (130 of FIG. 1) via the sensing line 114 that is coupled to the sensing electrode 170b of the sensing cell 170.

In this case, the sensing signal is represented by a product of a driving signal Tx_RC sensed by the electric field sensing sensor 162, an amplification gain of an amplifier included in the electric field emitter 166, and a signal Em_Rx that is an output from the electric field emitter and is applied to the sensing electrode 170b.

That is, the sensing signal is equal to Tx_RC*(amplification gain)*Em_Rx, and the active stylus 160 through the sensing signal estimates the adjacent or touched position, such that the sensing signal and the position of the active stylus 160 should have the function relationship of 1:1.

However, as shown in FIG. 8(a), in the driving signal Tx_RC sensed by the electric field sensing sensor 162 of the active stylus, the strength of the driving signal Tx_RC sensed at the central portion of the driving electrode 170a becomes the largest when the active stylus moves in the arrow direction from point A of FIG. 7, that is, when the active stylus moves from the left end of the driving electrode 170a of the sensing cell 170 to the right end via the center.

Since the shape of the driving electrode 170a is a diamond shape, when the active stylus 160 is positioned at the center of the driving electrode, the overlapping area of the active stylus 160 and the driving electrode becomes the largest, as compared to the case where the active stylus 160 is positioned in other regions.

That is, when the active stylus 160 moves, the position for sensing the most of the electric field lines generated from the driving electrode 170a becomes the central portion of the driving electrode, and the overlapping area of the active stylus 160 and the driving electrode is reduced or minimized at the left and right ends of the driving electrode, such that the strength of the driving signal Tx_RC sensed by the electric field sensing sensor 162 of the active stylus 160 is the smallest in the region near the ends.

Referring to FIG. 8(b), the strength of the signal Em_Rx, that is output from the electric emitter 166 of the active stylus and applied to the sensing electrode 170b, is gradually reduced as the area overlapping with the sensing electrode 170b is gradually reduced as shown in FIG. 7, when the active stylus moves in the arrow direction from point A of FIG. 7, that is, when the active stylus moves from the left end of the driving electrode 170a configuring the sensing cell 170 to the right end via the center.

As a result, according to the structure of the electrode pattern shown in FIG. 7, the final sensing signal becomes a signal shown in FIG. 8(c) corresponding to a product of the signal Tx_RC shown in FIG. 8(a) and the signal Em_RX shown in FIG. 8(b).

However, the sensing signal shown in FIG. 8C does not have the function relationship with the position of the active stylus 160 as shown.

That is, when the active stylus 160, according to the exemplary embodiment of the present invention, is applied to the touch screen panel having the electrode pattern of FIG. 7, it is difficult to accurately recognize the position of the active stylus 160.

Therefore, an exemplary embodiment of the present invention improves or optimizes the electrode pattern structure of the touch screen panel, thereby making it possible to improve the accuracy of the multi-touch recognition implementation by the active stylus.

The electrode pattern structure of the touch screen panel according to an exemplary embodiment of the present invention will be described with reference to FIGS. 9 to 11.

Figure 9:
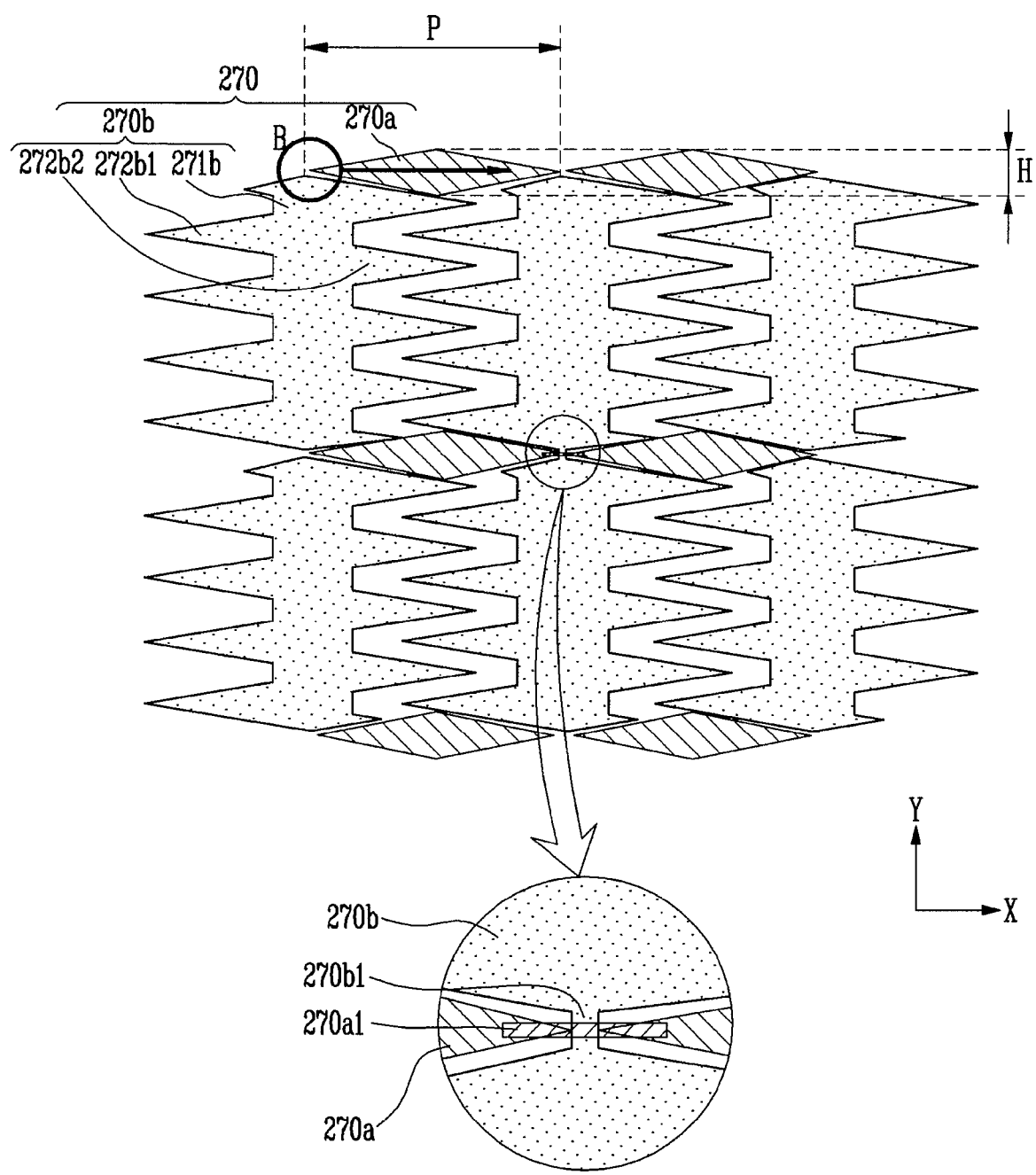
FIG. 9 is a plan view showing an electrode pattern of a touch screen panel according to an exemplary embodiment of the present invention.
Figure 10:
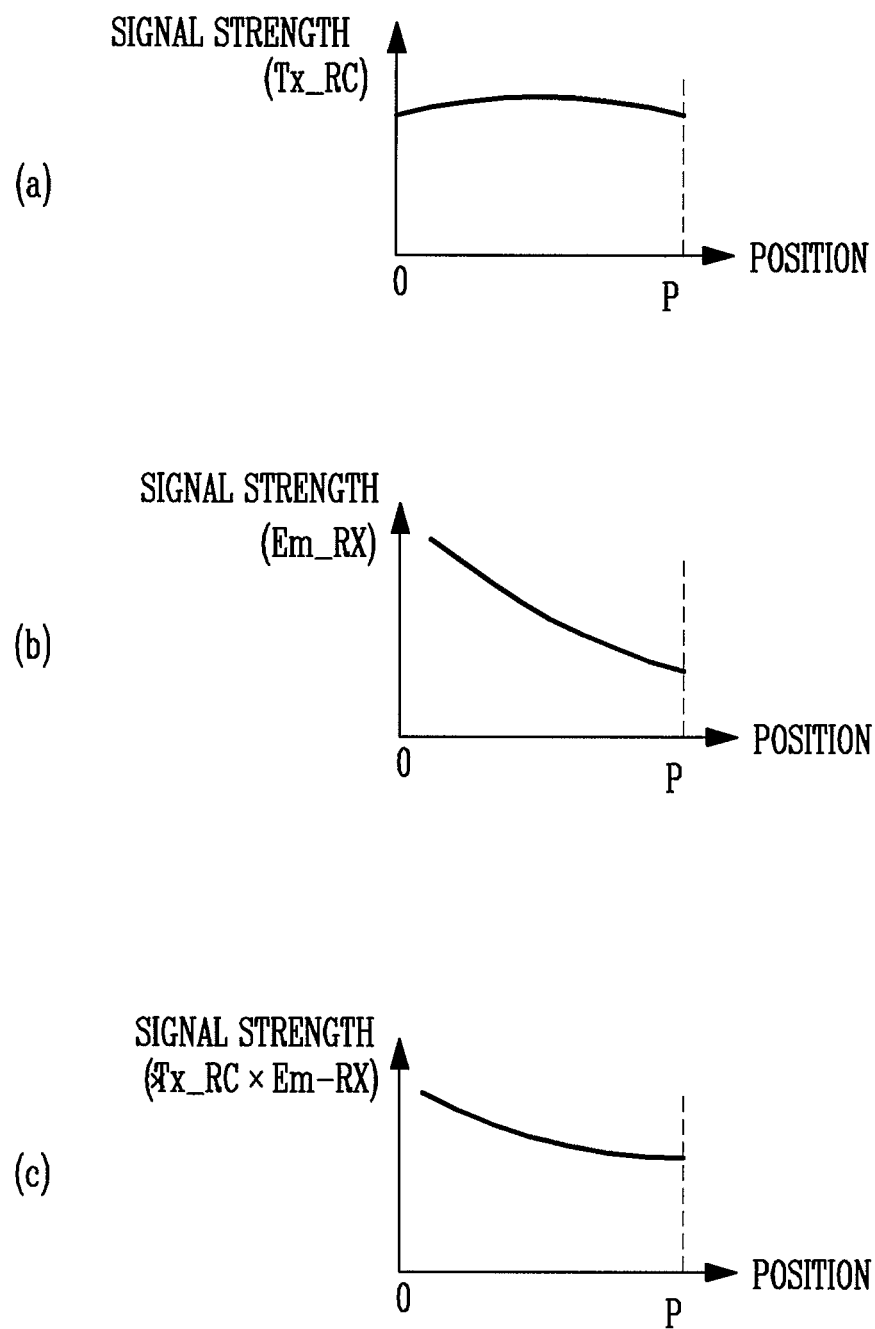
FIG. 10 is a graph for describing an effect when the active stylus moves, while touching the electrode pattern shown in FIG. 9.

FIG. 9 is a plan view showing the electrode pattern of the touch screen panel according to an exemplary embodiment of the present invention, and FIG. 10 is a graph for describing the case when the active stylus moves, while touching the electrode pattern shown in FIG. 9.

Referring to FIG. 9, sensing cells 270 are each configured to include the driving electrodes 270a and the sensing electrodes 270b that are adjacent to and alternately arranged with the driving electrodes 270a.

In this embodiment, the plurality of driving electrodes 270a are coupled to one another along the first direction (X-axis direction), and the sensing electrodes 270b are alternately disposed with the driving electrodes 270a so as not to overlap with each other, but the sensing electrodes 270b are coupled to each other along a second direction (Y-axis direction) that crosses the first direction.

In addition, the driving electrodes 270a and the sensing electrodes 270b are each coupled in a line unit along the first and second directions by first and second connection patterns 270a1 and 270b1, respectively, which are shown in the enlarged region of FIG. 9 as the crossing point.

In this case, the first and/or second connection patterns 270a1 and 270b1 may be each patterned to have an independent pattern to be coupled to the driving electrode 270a or the sensing electrode 270b by a direct or an indirect connection, or may be patterned to be integrally coupled to the driving electrode 270a or the sensing electrode 270b in a step of patterning the driving electrode 270a or the sensing electrode 270b.

For example, the first connection patterns 270a1 are each patterned on the upper or lower layer of the driving electrodes 270a as the independent pattern, such that the driving electrodes 270a may be coupled in a line unit along the first direction while being electrically coupled to one another by the first connection patterns 270a1 at the upper portion or the lower portion of the driving electrodes 270a.

The first connection patterns 270a1 may be formed using the transparent electrode material such as ITO, etc., that is similar to the electrodes 270a and 170b, or may be formed using the opaque low resistance material, but may be formed while controlling its width, etc., so as to prevent the visualization of the pattern.

In addition, the second connection patterns 270b1 may be integrally patterned with the sensing electrodes 270b, in a step of patterning the electrodes 270a and 270b, to couple the sensing electrodes 270b to one another in a line unit along the second direction.

In this case, an insulating layer (not shown) may be interposed between the first connection patterns 270a1 and the second connection patterns 270b1 in order to secure their stability. Through this embodiment, even though the driving electrodes 270a and the sensing electrodes 170b are formed on the same layer, the short circuit at the crossing point of the electrodes may be prevented.

In addition, as shown in FIG. 9, the exemplary embodiment of the present invention is configured in a different type such that the driving electrodes 270a and the sensing electrodes 270b have different areas. As shown in FIG. 9, the length of the driving electrodes 270a in the second direction, that is the vertical height thereof, is implemented to be shorter than the length of the sensing electrodes 270b in the second direction.

In more detail, the driving electrodes 270a are implemented in a polygon shape of which the length in the first direction (left to right width P) is longer than the length in the second direction (vertical height H). That is, when comparing with the driving electrode pattern shown in FIG. 7, the driving electrode pattern is relatively flat or elongated in the second direction and has a shape more extended in the left and right directions.

In connection with this, the sensing electrodes 270b are implemented in a shape including a body 271b extending in a height or vertical direction (the second direction, Y-axis direction) and a plurality of protrusions 272b1 and 272b2 protruded from the left and right of the body 271b, respectively, that is, in the first direction (X-axis direction).

In this embodiment, the first protrusions 271b1 protruded at the left of the body 271b and the second protrusions 271b2 protruded at the right thereof are arranged in an X-shape or offset. Therefore, in the adjacent sensing electrodes 270b, the second protrusions 271b2 of a left sensing electrode and the first protrusions 271b1 of a right sensing electrode are arranged in an X-shape or interleaved, as shown in FIG. 9.

In the sensing cell 270 having the above described structure, when the sensing cell 270 is being touched, the driving signal is applied to the driving line (112 of FIG. 1) that is coupled to the driving electrode 270a, and the sensing signal corresponding to driving signal is applied to the sensing circuit (130 of FIG. 1) through the sensing line (114 of FIG. 1) that is coupled to the sensing electrode 270b.

In addition, the exemplary embodiment of FIG. 9 configures the driving electrode 270a and the sensing electrode 270b of the sensing cell 270 in different shapes, such that when the active stylus 160, according to the exemplary embodiment of the present invention described with reference to FIGS. 5 and 6, moves while touching the sensing cell 270, the accuracy of the touch recognition may be implemented by the active stylus 160, by maintaining the position correlation between the moving active stylus 160 and the sensing cell 270 corresponding thereto.

For example, the following description will be made with reference to FIGS. 9 and 10 under the assumption that the active stylus 160 moves in the arrow direction, while approaching or touching point B of FIG. 9, that is, moves from the left end to the right end via the center through a length P from the left to right corners of the driving electrode 270a of the sensing cell 270.

However, as shown in FIG. 10(a), the strength of the driving signal Tx_RC that is sensed by the electric field sensing sensor 162 of the active stylus 160 becomes substantially constant when the active stylus moves in the arrow direction from point B of FIG. 9, that is, when the active stylus moves from the left end of the driving electrode 270a of the sensing cell 270 to the right end via the center.

With the shape of the driving electrode 270a as shown in FIG. 9, the height of the central portion of the driving electrode 270a is considerably reduced to have a shape more extended in the left and right directions. Therefore, the driving electrode 270a has a more flat or elongated shape when it is compared with the driving electrode 170a shown in FIG. 7.

That is, in the case of the driving electrode 170a having the diamond shape shown in FIG. 7, when the active stylus 160 is disposed at the center of the driving electrode 170a, the overlapping area between the active stylus 160 and the driving electrode 170a is considerably large, as compared with the case where the active stylus 160 is positioned in other regions, such that the active stylus 160 at the center position of the driving electrode 170a senses the most amount of electric field lines that are generated by the driving electrode 170a as compared with other regions. However, in the case of the driving electrode 270a having the shape shown in FIG. 9, the height H of the central portion of the driving electrode 270a is considerably reduced as compared with the driving electrode 170a.

Referring to FIG. 10(b), the strength of the signal Em_Rx, that is output from the electric emitter 166 of the active stylus and applied to the sensing electrode 270b, is gradually reduced as the area overlapping with the sensing electrode 270b is gradually reduced as shown in FIG. 9, when the active stylus 160 moves in an arrow direction from point B of FIG. 9, that is, when the active stylus moves from the left end of the driving electrode 270a of the sensing cell 270 to the right end via the center.

In this case, however, the sensing electrode 270b shown in FIG. 9 includes the plurality of protrusions 272b1 and 272b2 protruded in the left and right directions of the body 271b that extends in the height direction (second direction, Y-axis direction), such that the area overlapping with the sensing electrode 270b is large as compared with the exemplary embodiment shown in FIG. 7, even though the active stylus moves.

Therefore, as shown in FIG. 10(b), the strength of the Em-Rx signal is relatively larger than that of the Em_Rx signal shown in FIG. 8(b).

As a result, according to the structure of the electrode pattern of the exemplary embodiment shown in FIG. 9, the final sensing signal becomes a signal shown in FIG. 10(c) corresponding to a product of the signal Tx_RC shown in FIG. 10(b) and the signal Em_RX shown in FIG. 10(b).

That is, the Tx_RC shown in FIG. 10(a) has a function relation of 1:1, that is, a linear characteristic, and the strength of signal Em_Rx shown in FIG. 10(b) is relatively large, such that the sensing signal shown in FIG. 10(c) has the function relationship with the position of the active stylus 160 and the strength of the absolute signal is large.

Therefore, it is possible to improve the accuracy of the touch recognition implementation by the active stylus, by optimizing the electrode pattern structure of the touch screen panel through the application of the electrode pattern shown in FIG. 9.

Figure 11:
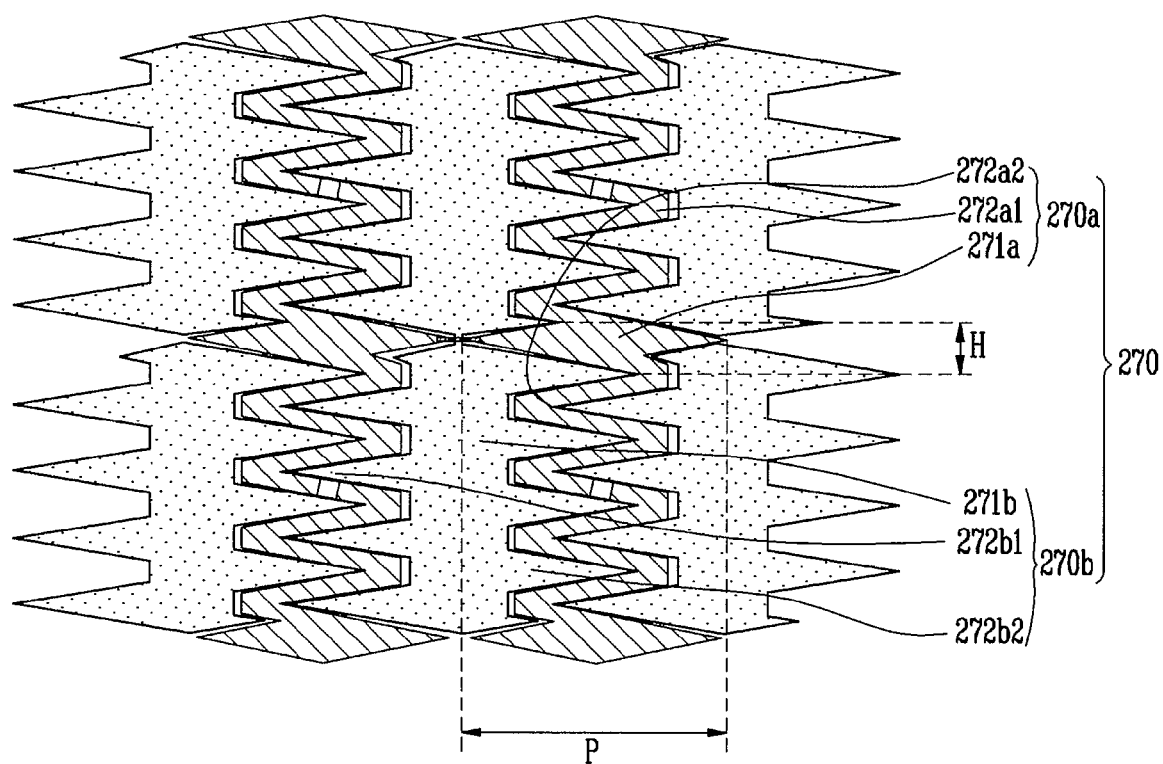
FIG. 11 is a plan view showing the electrode pattern of the touch screen panel according to an exemplary embodiment of the present invention.

FIG. 11 is a plan view showing the electrode pattern of the touch screen panel according to an exemplary embodiment of the present invention.

However, the electrode pattern shown in FIG. 11 is similar to the electrode pattern structure shown in FIG. 9, and therefore, like components are denoted by like reference numerals. As a result, the description thereof will not be described for convenience.

Referring to FIG. 11, as shown, in the exemplary embodiment of the present invention, the driving electrodes 270a are implemented in a shape including the body 271a extending in a longitudinal direction (the first direction, X-axis direction) and the protrusions 272a1 and 272a2 protruded from the upper and lower portions of the body 271a, respectively, in the second direction (Y-axis direction).

In this case, the body 271a has substantially the same shape as the driving electrode 270a shown in FIG. 9 and is implemented in a polygon shape of which the length of the first direction (left to right width P) is longer than the length of the second direction (vertical height H).

Further, the sensing electrodes 270b have the same shape as the sensing electrodes 270b shown in FIG. 9 and are implemented in a shape including a body 271b arranged in a height direction (second direction, Y-axis direction) and a plurality of protrusions 272b1 and 272b2 protruded from the left and right of the body 271b, that is, the first direction (X-axis direction).

In this case, the first protrusions 271b1 protruded at the left of the body 271b and the second protrusions 271b2 protruded at the right thereof are arranged in an X-shape or offset. Therefore, in the adjacent sensing electrodes 270b, the second protrusions 271b2 of the left sensing electrodes and the first protrusions 271b1 of the right sensing electrodes are arranged in an X-shape or interleaved, as shown.

As shown, the first protrusion 271a1 protruded from the upper side and the second protrusion 271a2 protruded from the lower side of the body 271a of the driving electrode are implemented in a zigzag shape disposed between the first and second protrusions 271b1 and 271b2 of the adjacent sensing electrodes 270b.

By the above-mentioned configuration, the entire area of the driving electrode 270a may be implemented wider, such that the touch recognition sensitivity of the active stylus 160 may be more improved.

Figure 12A:
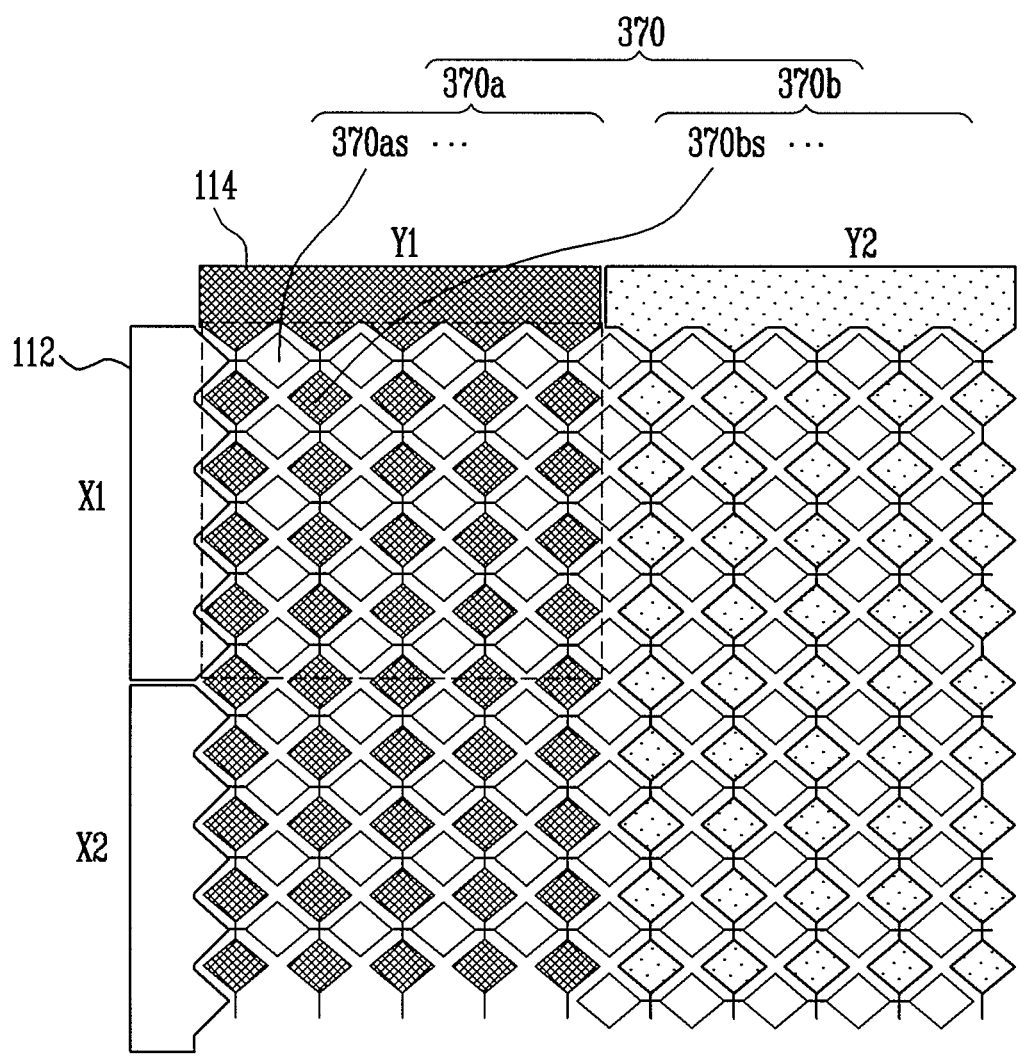
FIGS. 12A and 12B are plan views showing the electrode pattern of the touch screen panel according to another exemplary embodiment of the present invention.
Figure 12B:
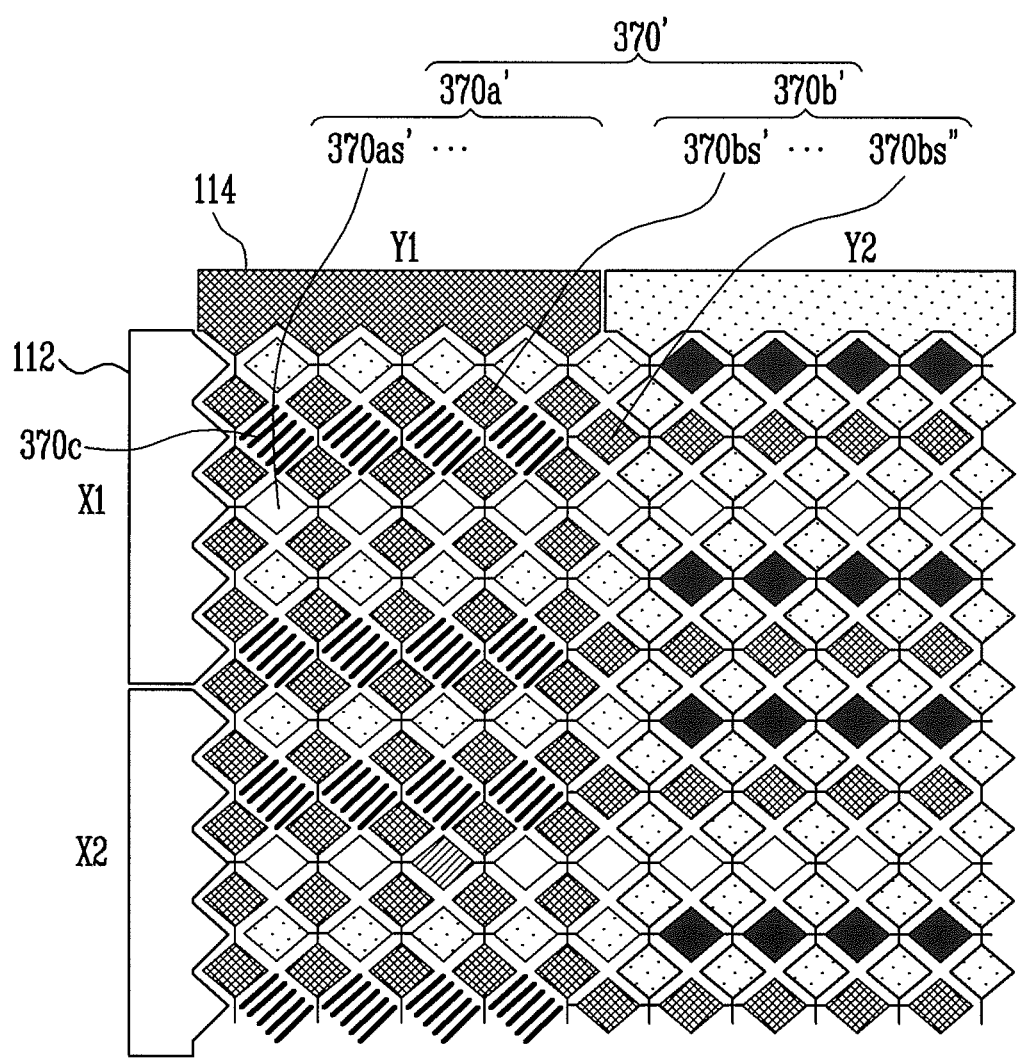

FIGS. 12A and 12B are plan views showing the electrode pattern of the touch screen panel according to another exemplary embodiment of the present invention.

The electrode pattern structure according to the exemplary embodiment shown in FIGS. 12A and 12B is also implemented to maintain the position correlation between the active stylus 160 and the sensing cells 370 and 370' corresponding thereto.

First, referring to FIG. 12A, the sensing cell 370 is configured to include a driving electrode 370a that is coupled to the driving line 112 and a sensing electrode 370b that is coupled to the sensing line 114 while being adjacent to the driving electrode 370a. That is, a region represented by a dotted line in FIG. 12A corresponds to the sensing cell 370.

In this case, the driving electrode 370a and the sensing electrode 370b are each implemented as a combination of a plurality of fine patterns 370as and 370bs, respectively, as shown in FIG. 12A.

The plurality of fine patterns 370as of the driving electrode 370a may be arranged in, for example, a 5×5 matrix type as shown, and the plurality of second fine patterns 370bs of the sensing electrode 370b corresponding thereto may be arranged in the 5×5 matrix type such that they are alternately disposed with the first fine patterns 370as without overlapping with each other.

In addition, the first fine patterns 370as and the second fine patterns 370bs adjacent thereto may be implemented to have the same structure as the arrangement and connection of the electrode patterns shown in FIG. 7, and therefore, the detailed description thereof will be omitted.

As described above, the fine touch by the stylus may be sensed by implementing the driving electrode 370a and the sensing electrode 370b in the plurality of fine patterns 370as and 370bs.

In this case, however, when the active stylus 160, according to the exemplary embodiment of FIG. 12A, is touched, the position correlation between the corresponding sensing cells 370 may not be maintained. In order to overcome the problem, the electrode pattern structure may be changed as shown in FIG. 12B.

In FIG. 12B, that is different from the exemplary embodiment of FIG. 12A, a driving electrode 370a' configuring a sensing cell 370' includes only a single line of first fine patterns 370as'.

That is, the same effect as using the driving electrode shown in FIGS. 9 and 11 may be obtained by reducing the length of the height direction of the driving electrode 370as'.

In addition, the region of other first fine patterns, other than the first fine patterns 370as', may be provided with an island dummy pattern 370c or third fine patterns 370bs'' that are coupled to the second fine patterns 370bs' of the sensing electrode 370b', as shown in FIG. 12B.

FIGS. 7 to 11 show an example where the active stylus 160 moves in the specific region, but the exemplary embodiment of the present invention is not limited thereto. The active stylus 160 may be applied to all the regions of the touch screen panel that is approached or touched by the active stylus 160.

That is, according to the electrode pattern structures shown in FIGS. 9, 11, and 12, the position correlation between the active stylus 160 and the sensing cell (170, 270 or 370) corresponding thereto may be maintained, such that the accuracy of the touch recognition implementation by the active stylus may be improved.

However, the electrode pattern structure according to the present invention is not limited to the exemplary embodiment shown in FIGS. 9, 11, and 12. While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A touch screen system comprising:
  a touch screen panel comprising a plurality of driving electrodes coupled to a plurality of driving lines extending in a first direction and a plurality of sensing electrodes coupled to a plurality of sensing lines extending in a second direction crossing the first direction, the driving electrodes and the sensing electrodes being alternately arranged so as not to overlap with each other; and
  an active stylus separated from the touch screen panel, the active stylus being configured to output an electric field in synchronization with driving signals that are applied to the driving lines coupled to the driving electrodes that are adjacent to the active stylus,
  wherein the driving electrodes and the sensing electrodes have different areas.

2. The touch screen system according to claim 1, wherein one of the driving electrodes has a polygon shape having a width in the first direction longer than a width in the second direction.

3. The touch screen system according to claim 1, wherein a length in the second direction of one of the driving electrodes is shorter than a length in the second direction of one of the sensing electrodes.

4. The touch screen system according to claim 1, wherein the sensing electrodes have a shape including a body extending in the second direction and a plurality of protrusions protruded in the first direction from the left and right of the body.

5. The touch screen system according to claim 4, wherein the protrusions comprise first protrusions protruded from the left of the sensing electrode body and second protrusions protruded from the right of the sensing electrode body, and the first protrusions and the second protrusions are arranged to be offset in the second direction.

6. The touch screen system according to claim 5, wherein the first protrusions of one of the sensing electrodes and the second protrusion of an adjacent one of the sensing electrodes are arranged to be offset in the second direction.

7. The touch screen system according to claim 1, wherein one of the driving electrodes has a shape including a body extending in the first direction and at least one protrusion that protrudes in the second direction from upper or lower portions of the body.

8. The touch screen system according to claim 7, wherein the body of the driving electrode has a polygon shape having a length in the first direction longer than a length in the second direction.

9. The touch screen system according to claim 7, wherein the at least one protrusion protruded from the body of the driving electrode is between adjacent ones of the sensing electrodes.

10. The touch screen system according to claim 1, wherein the plurality of driving electrodes are coupled to each other along the first direction, and the plurality of sensing electrodes are coupled to each other along the second direction.

11. The touch screen system according to claim 1, wherein the plurality of driving electrodes and sensing electrodes are at the same layer and comprise a transparent conductive material.

12. The touch screen system according to claim 1, wherein the driving electrodes and the sensing electrodes comprise a combination of a plurality of fine patterns.

13. The touch screen system according to claim 1, wherein adjacent ones of the driving electrodes and the sensing electrodes configure independent sensing cells.

14. The touch screen system according to claim 13, further comprising:
a driving circuit for sequentially applying driving signals to the driving lines;
a sensing circuit coupled to the sensing lines, the sensing circuit being configured to receive sensing signals generated by detecting a change in capacitance sensed from each of the sensing cells; and
a processor for receiving the sensing signals from the sensing circuit to determine touched positions.

15. The touch screen system according to claim 1, wherein the active stylus comprises:
an electric field sensing sensor for sensing a first electric field generated by the driving signals applied to one of the driving lines that is touched or approached by the active stylus;
a signal generator for generating a signal in order to generate a second electric field corresponding to the sensed first electric field;
an electric field emitter for amplifying the signal generated from the signal generator and outputting the amplified signals as the second electric field; and
a power supply for applying power to the electric field sensing sensor, the signal generator, and the electric field emitter.

16. The touch screen system according to claim 15, wherein the signal generated from the signal generator is an AC voltage having a same phase as the driving signals.

17. The touch screen system according to claim 15, wherein the electric emitter comprises a non-inverting amplifier that maintains a phase of the signal generated from the signal generator and amplifies the amplitude of the signal generated from the signal generator.

* * * * *